United States Patent
Aoki et al.

(10) Patent No.: US 7,700,818 B2
(45) Date of Patent: Apr. 20, 2010

(54) PROCESS FOR PRODUCING LIQUID HYDROCARBON WITH HYDROCRACKING CATALYST

(75) Inventors: Nobuo Aoki, Yokohama (JP); Hiroyuki Seki, Yokohama (JP); Masahiro Higashi, Yokohama (JP); Masakazu Ikeda, Yokohama (JP); Toshio Waku, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 12/178,691

(22) Filed: Jul. 24, 2008

(65) Prior Publication Data
US 2008/0306321 A1    Dec. 11, 2008

Related U.S. Application Data

(60) Division of application No. 11/532,640, filed on Sep. 18, 2006, now abandoned, which is a continuation of application No. PCT/JP2005/004728, filed on Mar. 10, 2005.

(30) Foreign Application Priority Data

Mar. 29, 2004   (JP)   ............... 2004-094817

(51) Int. Cl.
C07C 4/06    (2006.01)
C10G 47/14   (2006.01)
C10G 47/16   (2006.01)

(52) U.S. Cl. ................... 585/752; 208/111.01
(58) Field of Classification Search ........... 585/752; 208/111.01
See application file for complete search history.

(56) References Cited

U.S. PATENT DOCUMENTS

| 3,622,501 A | 11/1971 | Bertolacini et al. |
|---|---|---|
| 3,862,898 A | 1/1975 | Boyd et al. |
| 3,993,557 A | 11/1976 | Pine |
| 4,182,693 A | 1/1980 | Gladrow |
| 4,500,645 A | 2/1985 | Fuchikami et al. |
| 4,584,089 A | 4/1986 | Unmuth et al. |
| 4,585,748 A | 4/1986 | Usui et al. |
| 4,789,654 A | 12/1988 | Hirano et al. |
| 5,120,425 A | 6/1992 | Zones et al. |
| 5,318,692 A | 6/1994 | Eberly, Jr. et al. |
| 6,235,960 B1 | 5/2001 | Benazzi et al. |
| 6,576,119 B2 | 6/2003 | Ishida et al. |
| 6,821,412 B1 | 11/2004 | Fujukawa et al. |

FOREIGN PATENT DOCUMENTS

| EP | 0 537 815 A1 | 4/1993 |
|---|---|---|
| JP | 57-207546 A | 12/1982 |
| JP | 59-203639 A | 11/1984 |
| JP | 59-216635 A | 12/1984 |
| JP | 61-126196 A | 6/1986 |
| JP | 02-214544 A | 8/1990 |
| JP | 4-505124 A | 9/1992 |
| JP | 6-41549 A | 2/1994 |
| WO | 90-13615 A1 | 11/1990 |

OTHER PUBLICATIONS

J.A. Martens et al., "The potential and limitations of the n-decane hydroconversion as a test reaction for characterization of the void space of molecular sieve zeolites", Zeolites, vol. 6, pp. 334-348, (1986).

*Primary Examiner*—Thuan Dinh Dang
(74) *Attorney, Agent, or Firm*—Panitch Schwarze Belisario & Nadel LLP

(57) ABSTRACT

Provided is a process and catalyst for hydrocracking paraffinic hydrocarbons which provides satisfactorily high cracking activity and middle distillate yield as well as the low pour point of the resulting gas oil all together. The catalyst of the present invention comprises a crystalline aluminosilicate, alumina-boria and a noble metal of Group VIII of the Periodic Table.

9 Claims, No Drawings

PROCESS FOR PRODUCING LIQUID HYDROCARBON WITH HYDROCRACKING CATALYST

CROSS-REFERENCE TO RELATED APPLICATIONS

This application is a Divisional of U.S. patent application Ser. No. 11/532,640, filed Sep. 18, 2006, which was a Continuation of International Application No. PCT/JP2005/004728, filed Mar. 10, 2005, which was published in the Japanese language on Oct. 6, 2005, under International Publication No. WO 2005/092500 A1 and the disclosure of which is incorporated herein by reference.

BACKGROUND OF THE INVENTION

The present invention relates to a catalyst for producing liquid hydrocarbons from paraffinic hydrocarbons in the presence of hydrogen and a process for producing liquid hydrocarbons using such a catalyst.

In recent years, demands have been escalating rapidly toward a clean liquid fuel which is low in contents of sulfur and aromatic hydrocarbons. In response to such demands, fuel oil manufacturers have already been studying various processes for producing clean fuel. Among these, a process has been considered to be the most prospective in which process paraffinic hydrocarbons such as waxes are hydrocracked in the presence of a catalyst.

In a process of hydrocracking of a paraffinic hydrocarbon, it is important to produce useful middle distillates at higher yields in order to improve the economical efficiency of the process. In addition, the resulting gas oil is necessarily low in pour point. That is, development of a highly efficient hydrocracking catalyst which can enhance the cracking activity and middle distillate yield of the hydrocracking process and can render the process possible to produce a gas oil with low pour point holds the key to an improvement of economical efficiency of the process.

Hydrocracking of a vacuum gas oil has already been commercialized and is a technology which has been established for more than decades. However, since the difference between the reactivity of a paraffinic hydrocarbon and that of a vacuum gas oil is so significant that it is difficult to use the catalyst for the latter as it is for hydrocracking a paraffinic hydrocarbon, the research and development have been continued vigorously to aim development of a highly efficient catalyst for paraffinic hydrocarbons. There are a few but some patents and reports concerning such a catalyst. For example, Patent Document 1 below discloses a catalyst comprising platinum loaded into a support containing silica alumina. There is an example of a study in Non-Patent Document 1 wherein the hydrocracking of a paraffinic hydrocarbon was carried out using a catalyst comprising platinum loaded into a crystalline aluminosilicate (zeolite).

However, the crystalline aluminosilicate catalyst is at a satisfactorily higher level of the cracking activity but has disadvantages that the middle distillate yield is low and the resulting gas oil fails to obtain a sufficient pour point. On the other hand, amorphous solid acid catalysts a typical example of which is silica alumina are at satisfactorily higher level in middle distillate yield and the pour point of the resulting gas oil but low in cracking activity. That is, there has not been developed a catalyst which satisfies high cracking activity and middle distillate yield as well as the low pour point of the resulting gas oil all together, resulting in a serious hindrance to an improvement of economical efficiency of the hydrocracking process of paraffinic hydrocarbons.

(1) Patent Document 1: Japanese Patent Laid-Open Publication No. 6-41549

(2) Non-Patent Document 2: "Zeolite" (Volume 6, page 334 to 348, 1986)

BRIEF SUMMARY OF THE INVENTION

The present invention has an object to provide a novel catalyst for hydrocracking paraffinic hydrocarbons which can satisfy higher cracking activity and middle distillate yield and the lower pour point of the resulting gas oil all together thereby improving the productivity of the hydrocracking process.

As a result of an extensive research made by the present inventors, they completed the present invention based on the finding that the above-described problems can be solved with a catalyst comprising a crystalline aluminosilicate and alumina-boria in combination.

That is, the present invention relates to a catalyst for hydrocracking paraffinic hydrocarbons which comprises a crystalline aluminosilicate, alumina-boria and a noble metal of Group VIII of the Periodic Table.

The present invention also relates to the above-described catalyst wherein the average particle diameter of the crystalline aluminosilicate is 0.5 μm or smaller.

The present invention also relates a process for producing liquid hydrocarbons wherein paraffinic hydrocarbons are hydrocracked using the foregoing catalyst.

DETAILED DESCRIPTION OF THE INVENTION

The present invention will be described in more detail below.

The term "aluminosilicate" used herein denotes a metal oxide constituted by three elements, i.e., aluminum, silicon, and oxygen. Although another metal element may coexist to an extent that the present invention is not prohibited from achieving the advantageous effects, the amount of such a metal element is 5 percent by mass or less and preferably 3 percent by mass or less of the total amount of alumina and silica in the form of an oxide. Examples of the metal element which may coexist are titanium, lanthanum, manganese, gallium and zinc. Preferred are titanium and lanthanum.

The crystallinity of aluminosilicate can be estimated with the proportion of tetrahedrally coordinated Al atoms in all the Al atoms which proportion can be measured by a solid $^{27}Al$ NMR spectrum. The term "crystalline aluminosilicate" used in the present invention denotes that whose proportion of tetrahedrally coordinated Al atoms is 50 percent or more. Any crystalline aluminosilicate can be used in the present invention as long as the proportion of tetrahedrally coordinated Al atoms is 50 percent or more. However, it is preferred to use those containing 70 percent or more of the tetrahedrally coordinated Al atoms, and it is more preferred to use those containing 80 percent or more of the tetrahedrally coordinated Al atoms.

Crystalline aluminosilicates eligible for the present invention are so-called zeolites. Preferred are Y- or USY-type zeolites, beta-type zeolites, mordenite, and ZSM-5, and most preferred is USY-type zeolite. If necessary, two or more types of crystalline aluminosilicates may be used.

No particular limitation is imposed on the average particle diameter of the crystalline aluminosilicate to be used in the present invention. However, the average particle diameter is preferably 1.0 μm or smaller and particularly preferably 0.5 μm or smaller.

The hydrocracking catalyst of the present invention is characterized in that it comprises a crystalline aluminosilicate and alumina-boria. No particular limitation is imposed on the content ratio of alumina to boria in alumina-boria. However, in general the ratio of alumina to boria is preferably 30 to 99 percent by mass:70 to 1 percent by mass, more preferably 50 to 95 percent by mass:50 to 5 percent by mass, and most preferably 70 to 90 percent by mass:30 to 10 percent by mass.

No particular limitation is imposed on the mass ratio of the crystalline aluminosilicate to alumina-boria in the catalyst. However, in general the mass ratio is preferably from 0.001 to 2.000, more preferably 0.010 to 1.500 and most preferably 0.015 to 0.200.

The catalyst may be molded into a desired shape without using a binder. However, a binder may be used if necessary. No particular limitation is imposed on the binder. However, preferred binders are alumina, silica, silica-alumina, titania and magnesia, and most preferred is alumina. No particular limitation is imposed on the percentage of binder in the whole molded catalyst. However, it is usually from 5 to 99 percent by mass and preferably from 20 to 99 percent by mass.

The catalyst of the present invention necessarily contains a noble metal of Group VIII of the Periodic Table as an active component. When a metal other than that of Group VIII of the Periodic Table is used as an active agent, the middle distillate yield obtained by a hydrocracking process using a catalyst containing such a metal is extremely reduced thereby failing to achieve the purposes of the present invention.

Specific examples of the noble metal of Group VIII of the Periodic Table include cobalt, nickel, rhodium, palladium, iridium, and platinum. Most preferred are palladium and platinum. The catalyst of the present invention can be produced by loading these metals into the above-described molded catalyst by a well-known method such as impregnation or ion-exchange.

If necessary, two or more noble metals may be loaded in combination. For example, both platinum and palladium may be loaded. No particular limitation is imposed on the loaded amount of the noble metal. The amount is usually from 0.02 to 2 percent by mass based on the total mass of the catalyst.

In the present invention, the term "paraffinic hydrocarbon" used herein denotes hydrocarbons the paraffin molecule content of which is 70 percent by mol or more. No particular limitation is imposed on the carbon atom number of the hydrocarbon molecules. However, those having from 10 to 100 carbon atoms are usually used. The catalyst of the present invention is particularly effective for hydrocracking paraffinic hydrocarbons having 20 or more carbon atoms, so-called "wax".

No particular limitation is imposed on the process for producing a paraffinic hydrocarbon which will be the feedstock of the hydrocracking process. Therefore, the catalyst of the present invention is applicable to various paraffinic hydrocarbons such as petroleum-based or synthetic paraffinic hydrocarbons. However, particularly preferred paraffinic hydrocarbons are so-called FT waxes produced by Fischer-Tropsch synthesis.

The catalyst of the present invention may be used in a conventional fixed bed reactor apparatus. The reaction conditions are a reaction temperature of 200 to 500° C., a hydrogen pressure of 0.5 to 12 MPa, and an LHSV (liquid hourly space velocity) of a paraffinic hydrocarbon feedstock of 0.1 to 10/h. Preferred conditions are a reaction temperature of 250 to 400° C., a hydrogen pressure of 2.0 to 8.0 MPa, and an LHSV (liquid hourly space velocity) of a paraffinic hydrocarbon feedstock of 0.3 to 5.0/h.

When the catalyst of the present invention comprising the above-described aluminosilicate, alumina-boria and a noble metal of Group VIII of the Periodic Table is used for hydrocracking paraffinic hydrocarbons, it can achieve high cracking activity and middle distillate yield and the low pour point of the resulting liquid hydrocarbon all together.

The present invention will be described in more detail with reference to the following examples and comparative examples but are not limited thereto.

EXAMPLE 1

A column-like support with a size of 1/16 inch (about 1.6 mm) comprising 30 g of a USY zeolite with an average particle diameter of about 0.4 μm and 970 g of alumina-boria was impregnated with an aqueous solution containing dichlorotetraammine platinum (II) in such an amount that the amount of the platinum element was 0.8 percent by mass of the support. The support was dried at a temperature of 120° C. for 3 hours and calcined at a temperature of 500° C. for one hour thereby preparing a catalyst.

The catalyst thus prepared (200 ml) was filled into a fixed bed flow reactor and used to hydrocrack a paraffinic hydrocarbon. The feedstock used herein was an FT wax whose paraffin content was 95 percent and carbon number distribution was from 20 to 80. The hydrogen pressure was 3 MPa, while the LHSV of the feedstock was 2.0/h. The fraction whose boiling point was 360° C. or lower was defined as "cracked product". The reaction temperature at which the cracked product in an amount of 80 percent by mass based on the feed stock was obtained was measured. Also measured were the yield of the middle distillate whose boiling point was from 145° C. to 360° C. and the pour point of the resulting gas oil whose boiling point was from 260° C. to 360° C. The results are set forth in Table 1 below.

EXAMPLE 2

30 g of a USY zeolite with an average particle diameter of about 0.4 μm, 570 g of alumina-boria powder, and 400 g of alumina used as a binder were molded thereby obtaining a column-like support with a size of 1/16 inch (about 1.6 mm). Platinum was loaded into the support such that the amount of the platinum was 0.8 percent by mass of the support in the same manner as Example 1. The support was dried at a temperature of 120° C. for 3 hours and calcined at a temperature of 500° C. for one hour thereby preparing a catalyst.

Hydrocracking was conducted using this catalyst in the same manner as Example 1 so as to measure the reaction temperature at which the cracked product in an amount of 80 percent by mass based on the feed stock was obtained, the yield of the middle distillate whose boiling point was from 145° C. to 360° C. and the pour point of the resulting gas oil whose boiling point was from 260° C. to 360° C. The results are set forth in Table 1 below.

EXAMPLE 3

Preparation of a catalyst and hydrocracking were conducted by the same procedures of Example 1 except that a USY-type zeolite with an average particle diameter of 0.8 μm was used so as to measure the reaction temperature at which the cracked product in an amount of 80 percent by mass based on the feed stock was obtained, the yield of the middle distillate whose boiling point was from 145° C. to 360° C. and the pour point of the resulting gas oil whose boiling point was from 260° C. to 360° C. The results are set forth in Table 1 below.

Comparative Example 1

Preparation of a catalyst and hydrocracking were conducted by the same procedures of Example 1 except that alumina was used instead of alumina-boria so as to measure the reaction temperature at which the cracked product in an amount of 80 percent by mass based on the feed stock was obtained, the yield of the middle distillate whose boiling point was from 145° C. to 360° C. and the pour point of the resulting gas oil whose boiling point was from 260° C. to 360° C. The results are set forth in Table 1 below.

Comparative Example 2

Preparation of a catalyst and hydrocracking were conducted by the same procedures of Example 1 except that a USY-type zeolite was not used so as to measure the reaction temperature at which the cracked product in an amount of 80 percent by mass based on the feed stock was obtained, the yield of the middle distillate whose boiling point was from 145° C. to 360° C. and the pour point of the resulting gas oil whose boiling point was from 260° C. to 360° C. The results are set forth in Table 1 below.

Comparative Example 3

Preparation of a catalyst and hydrocracking were conducted by the same procedures of Example 1 except that the support loaded with nickel in an amount of 5 percent by mass based on the support and tungsten in an amount of 15 percent by mass based on the support instead of platinum so as to measure the reaction temperature at which the cracked product in an amount of 80 percent by mass based on the feed stock was obtained, the yield of the middle distillate whose boiling point was from 145° C. to 360° C. and the pour point of the resulting gas oil whose boiling point was from 260° C. to 360° C. The results are set forth in Table 1 below.

As apparent from the results set forth in Table 1, the combination of a crystalline aluminosilicate and alumina-boria can satisfy high cracking activity, high middle distillate yield and the low pour point of the resulting gas oil all together. Furthermore, it was also apparent that noble metals of the Group VIII of the Periodic Table are effective as active metals.

TABLE 1

| | Cracking Temperature ° C. | Middle Distillate Yield mass % | Pour Point of Resulting Gas Oil ° C. |
|---|---|---|---|
| Example 1 | 298 | 52.9 | −37.5 |
| Example 2 | 305 | 53.0 | −37.5 |
| Example 3 | 301 | 50.9 | −37.5 |
| Comparative Example 1 | 330 | 47.5 | −30.0 |
| Comparative Example 2 | 355 | 47.4 | −37.5 |
| Comparative Example 3 | 361 | 25.5 | −35.0 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing a liquid hydrocarbon comprising hydrocracking a paraffinic hydrocarbon using a catalyst comprising a USY-type zeolite crystalline aluminosilicate, alumina-boria and a noble metal of Group VIII of the Periodic Table.

2. The process for producing a liquid hydrocarbon according to claim 1, wherein an average particle diameter of the USY-type zeolite aluminosilicate is 1.0 μm or smaller.

3. The process for producing a liquid hydrocarbon according to claim 1, wherein an average particle diameter of the USY-type zeolite aluminosilicate is 0.5 μm or smaller.

4. The process according to claim 1, wherein the noble metal is selected from the group consisting of rhodium, palladium, iridium, and platinum.

5. The process according to claim 1, wherein a ratio of alumina to boria in the catalyst is 30 to 99% by mass:70 to 1% by mass.

6. The process according to claim 1, wherein a mass ratio of aluminosilicate to alumina-boria in the catalyst is 0.001 to 2.000.

7. The process according to claim 1, wherein the paraffinic hydrocarbon comprises at least 70% by mol paraffinic molecules.

8. The process according to claim 1, wherein the paraffinic hydrocarbon comprises a Fischer Tropsh wax.

9. The process according to claim 1, wherein the process is performed in a fixed bed reactor apparatus.

* * * * *